United States Patent
Okuda (10) Patent No.: US 7,815,165 B2
(45) Date of Patent: Oct. 19, 2010

(54) VALVE DEVICE HAVING BARRIER FOR SUPPRESSING TRANSMISSION OF PULSATING WAVES

(75) Inventor: Hideki Okuda, Nagoya (JP)

(73) Assignee: Denso Corporation, Kariya (JP)

( * ) Notice: Subject to any disclaimer, the term of this patent is extended or adjusted under 35 U.S.C. 154(b) by 358 days.

(21) Appl. No.: 12/007,310

(22) Filed: Jan. 9, 2008

(65) Prior Publication Data
US 2008/0290306 A1  Nov. 27, 2008

(30) Foreign Application Priority Data
May 24, 2007  (JP)  ............... 2007-138104

(51) Int. Cl.
*F16K 47/00* (2006.01)
(52) U.S. Cl. .............. 251/127; 251/129.01; 251/129.15
(58) Field of Classification Search ............... 251/118, 251/127, 129.01, 129.15
See application file for complete search history.

(56) References Cited

U.S. PATENT DOCUMENTS

| 4,651,971 A * | 3/1987 | Donahue, Jr. .......... 251/129.15 |
| 5,630,403 A * | 5/1997 | Van Kampen et al. ....... 123/520 |
| 5,970,963 A | 10/1999 | Nakase et al. |
| 2006/0243939 A1 * | 11/2006 | Seko ................ 251/129.19 |

FOREIGN PATENT DOCUMENTS

| JP | 03-022186 | 3/1991 |
| JP | 08-100862 | 4/1996 |
| JP | 2001-98959 | 4/2001 |
| JP | 2001-295960 | 10/2001 |
| JP | 2001-324045 | 11/2001 |

OTHER PUBLICATIONS

Japanese Office Action dated Jan. 13, 2009, issued in corresponding Japanese Application No. 2007-138104, with English translation.

* cited by examiner

*Primary Examiner*—John K Fristoe, Jr.
(74) *Attorney, Agent, or Firm*—Nixon & Vanderhye PC (57) ABSTRACT

A present invention is advantageously applied to a purge valve for purging evaporated fuel stored in a canister to an intake pipe of an engine. The purge valve has a fluid passage connecting an inlet port and an outlet port, and a normally closed valve port that is selectively opened by operation of an electromagnetic actuator is disposed in the fluid passage. A barrier pillar is disposed in the fluid passage between the inlet port and the valve port to suppress transmission of pulsating waves generated in the purge valve to the canister. Flow resistance of the barrier pillar is higher in a reverse flow direction from the valve port to the inlet port than in a normal flow direction from the inlet port to the valve port. The transmission of the pulsating waves is well suppressed by the barrier pillar while allowing a smooth flow from the canister into the purge valve.

13 Claims, 7 Drawing Sheets

VALVE DEVICE HAVING BARRIER FOR SUPPRESSING TRANSMISSION OF PULSATING WAVES

CROSS-REFERENCE TO RELATED APPLICATION

This application is based upon and claims benefit of priority of Japanese Patent Application No. 2007-138104 filed on May 24, 2007, the content of which is incorporated herein by reference.

BACKGROUND OF THE INVENTION

1. Field of the Invention

The present invention relates to a valve device for opening or closing a fluid passage and especially to such a valve device used as a purge valve for purging evaporated fuel stored in a canister mounted on an automotive vehicle.

2. Description of Related Art

In a valve device, pulsating waves are generated when a valve port in a fluid passage is abruptly closed, and the pulsating waves are transmitted to an upstream portion of the valve port. This phenomenon is known as a water-hammer phenomenon. For example, in a purge valve disposed in a passage between an engine and a canister for selectively supplying evaporated fuel stored in the canister to the engine, pulsating pressure waves are generated in the valve device when the passage is closed. The pulsating pressure waves are transmitted to the canister, and noises are generated in the canister.

JP-A-2001-295960 proposes a purge valve having a space for suppressing the pulsating waves. By enlarging a volume of the space, generation of the pulsating waves in the purge valve is better suppressed. However, there is a problem that a size of the purge valve becomes large by enlarging the space for suppressing the pulsating waves.

In addition, there is a recent tendency that an intake negative pressure of an engine becomes lower, and therefore, the purge valve becomes larger to provide a larger volume passage therein. In the large volume passage, an amount of the pulsating waves generated therein becomes larger. To suppress generation of the large amount of the pulsating waves, the suppressing space having a large volume is required, resulting in increase in the size of the purge valve. The same problem is similarly involved in valve devices other than the purge valve.

SUMMARY OF THE INVENTION

The present invention has been made in view of the above-mentioned problem, and an object of the present invention is to provide an improved valve device, in which transmission of pulsating waves is suppressed without increasing a size of the valve device.

The valve device according to the present invention is advantageously used as a purge valve for purging evaporated fuel stored in a canister to an intake pipe of an engine. The purge valve includes a housing having an inlet passage through which evaporated fuel is taken into the purge valve from the canister, an outlet port for supplying the evaporated fuel to the engine, and a fluid passage connecting the inlet port and the outlet port. A valve port is disposed in the fluid passage for selectively open the valve port to thereby purge the evaporated fuel to the engine.

The valve port is normally closed by a valve body that is biased by a biasing spring to a direction to close the valve port. The valve body is driven by an electromagnetic actuator to thereby open the valve port. When the valve port is opened, the evaporated fuel stored in the canister is purged into the engine through the purge valve. The purge valve also includes an enlarged chamber for reducing an amount of pulsating waves generated in the purge valve.

A barrier pillar is disposed in the fluid passage between the inlet port and the valve port to suppress transmission of the pulsating waves to the canister through the input port. The barrier pillar has a low flow resistance in a normal flow direction from the inlet port to the valve port, and a higher flow resistance in a reverse flow direction from the valve port to the inlet port. Accordingly, transmission of the pulsating waves generated in the purge valve to the canister is suppressed by the barrier pillar, while the evaporated fuel smoothly flows into the purge valve from the canister without being much disturbed by the barrier pillar.

The barrier pillar may be formed to have various cross-sections as long as the flow resistance in the normal flow direction is lower than that of the reverse flow direction. For example, it may be formed in a half circular shape or in a triangular shape. The barrier pillar may includes a small hole or slit.

According to the present invention, transmission of the pulsating waves generated in the purge valve to the canister is well suppressed without increasing a volume of the purge valve, thereby reducing noises due to the pulsating waves. Other objects and features of the present invention will become more readily apparent from a better understanding of the preferred embodiment described below with reference to the following drawings.

BRIEF DESCRIPTION OF THE DRAWINGS

FIGS. 4(a) and (b) are schematic views showing specific types of the barrier pillars;

FIGS. 5(a) and (b) are schematic views showing other types of the barrier pillar that includes a hole or slit;

DETAILED DESCRIPTION OF THE PREFERRED EMBODIMENT

A preferred embodiment of the present invention will be described with reference to accompanying drawings. A valve device of the present invention is advantageously used as a purge valve disposed between an internal combustion engine and a canister for storing evaporated fuel therein. First, referring to FIG. 10, an entire purge system for an internal combustion engine will be explained.

Figure 10:
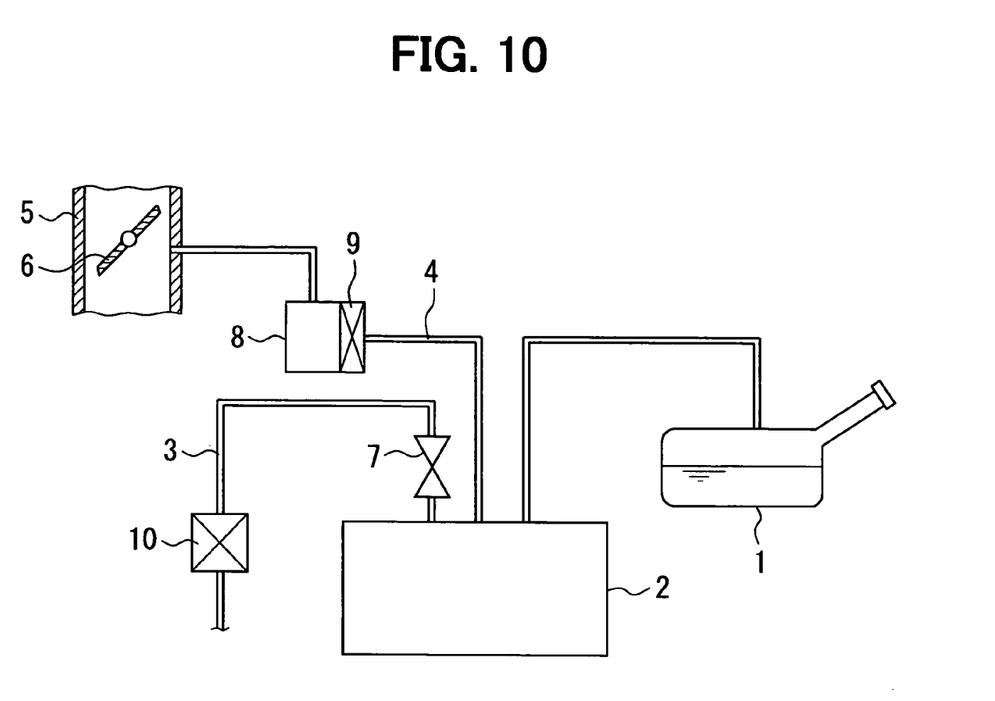
FIG. 10 is a block diagram showing an entire purge system for an internal combustion engine mounted on an automotive vehicle.

Fuel evaporated in a fuel tank 1 is absorbed and stored in a canister 2. Atmospheric air is introduced into the canister 2 through a filter 10, an air-introducing passage 3 and a release valve 7. The canister 2 is connected to an intake pipe 5 of the internal combustion engine at a downstream portion of a throttle valve 6 through a purging passage 4. A purge valve 8 having a filter 9 there in is disposed in the purging passage 4. By opening the release valve 7 and the purge valve 8 while the engine is being operated, the evaporated fuel stored in the canister 2 is introduced into the intake pipe 5.

Figure 1:
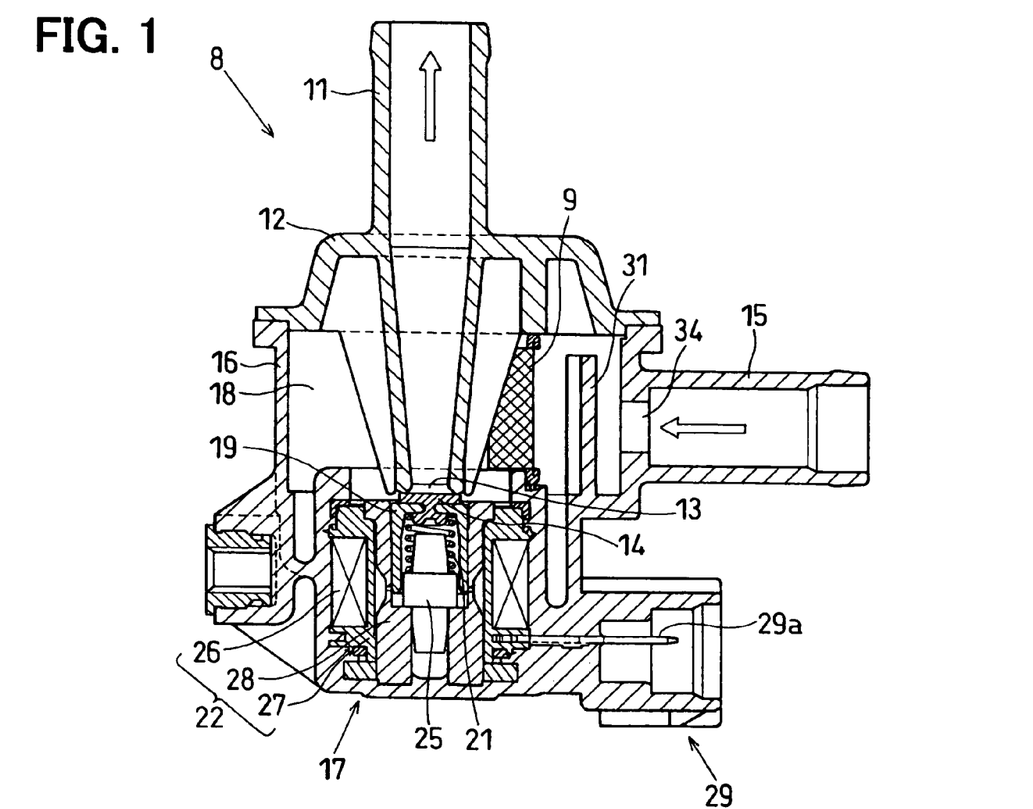
FIG. 1 is a cross-sectional view showing a purge valve according to the present invention.
Figure 2:
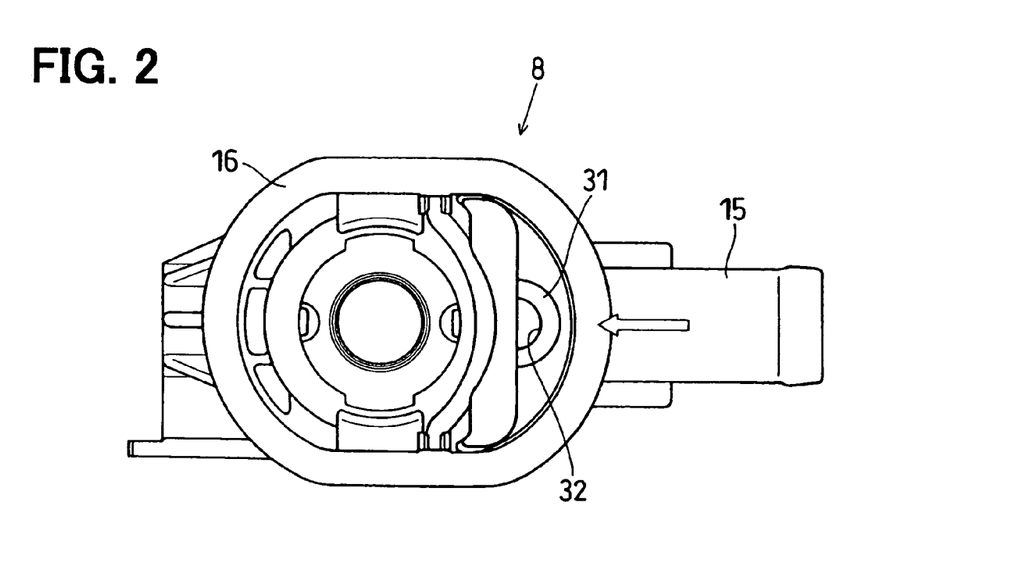
FIG. 2 is a plan view showing the purge valve shown in FIG. 1, with an outlet housing removed.

The purge valve 8 will be described with reference to FIG. 1. The purge valve 8 is a normally closed valve that is open when an electromagnetic actuator 17 is operated. In describing the purge valve 8, an upper side of FIG. 1 is referred to as an upper side of the purge valve 8 though the purge valve 8 is not always mounted on a vehicle in this direction. The purge valve 8 includes an outlet housing 12 forming an outlet port 11 to be connected to the intake pipe 5 of the engine, a valve body 14 for opening or closing a valve port 13, and a housing 16 forming an inlet port 15 to be connected to the canister 2. The electromagnetic actuator 17 for driving the valve body 14 is contained in the housing 16.

A chamber 18 having an enlarged space (referred to as an enlarged chamber) is formed in the housing 16. The enlarged chamber 18 communicates with the inlet port 15 and the outlet port 11 through a cylindrical portion extending to a middle portion of the housing 16. A valve port 13 is formed at a bottom end of the cylindrical portion. The valve port 13 is opened or closed by the valve body 14, made of rubber, connected to a moving core 19 of the electromagnetic actuator 17. Namely, the fluid passage formed in the purge valve 8 is opened when the valve body 14 leaves the valve port 13 and closed when the valve body sits on the valve port 13, thereby the purge passage 4 (shown in FIG. 10) is opened and closed.

The electromagnetic actuator 17 includes the moving core 19, a biasing spring 21 for biasing the moving core 19 in a direction to close the valve port 13 and a solenoid 22 for driving the moving core 19 in a direction to open the valve port 13 against a biasing force of the biasing spring 21. The moving core 19 is cup-shaped and made of a magnetic material such as iron. The biasing spring 21 is a compression spring and is held in the moving core 19 between the valve body 14 and a spring holder 25. A maximum amount of a lift of the valve body 14 from the valve port 13 is determined by the spring holder 15, i.e., when a bottom end of the moving core 19 abuts the spring holder 25, a downward movement of the moving core 19 stops.

The solenoid 22 includes a coil 26 connected to a connector terminal 29a, a stator 28 and a yoke 27. The solenoid 22 is molded with resin together with the housing 16. The coil 26 is formed by winding an insulated wire around a cylindrical bobbin made of resin. The yoke 27 made of a magnetic material holds the coil 26, and the stator 28 made of a magnetic material is fixedly disposed in the yoke 27. The yoke 27 and the stator 28 form a magnetic circuit, and the moving core 19 is slidably disposed in an inner bore of the stator 28. Upon energization of the coil 26, a magnetic field is formed in the yoke 27 and the stator 28. The moving core 19, to which the valve body 14 is connected, is driven in a downward direction in the magnetic field.

The connector terminal 29a electrically connected to the coil 26 is disposed in a connector portion 29 of the housing 16. The connector terminal 29a is further connected to an electronic control unit mounted on a vehicle (not shown). The electronic control unit calculates a density of evaporated fuel in the canister 2 and an amount of the evaporated fuel to be supplied to the engine by opening the purge valve 8. An air-fuel ratio suitable to the engine under various operating conditions is maintained by adjusting an amount of fuel injected from injectors according to the amount of the evaporated fuel supplied to the engine through the purge valve 8.

Operation of the purge valve 8 described above will be described. The electromagnetic actuator 17 is energized by supplying electric current to the coil 26. Upon energization of the electromagnetic actuator 17, the valve body 14 connected to the moving core 19 is lifted from the valve port 13 against a biasing force of the biasing spring 21, thus opening the valve port 13. The evaporated fuel stored in the canister 2 is supplied to the engine through the purge passage 4 and the purge valve 8. On the other hand, upon de-energization of the electromagnetic actuator 17, the valve port 13 is closed because the valve body 14 is pushed up by the biasing force of the biasing spring 21, thus terminating supply of the evaporated fuel to the engine.

Figure 7:
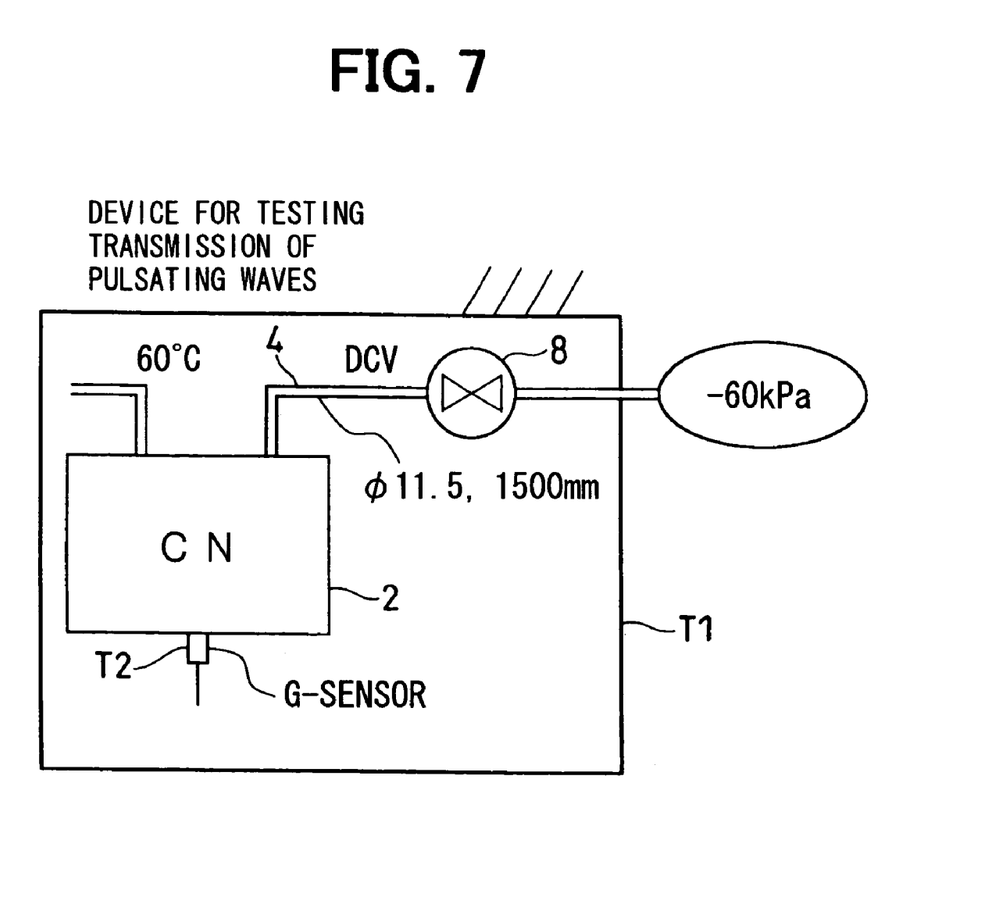
FIG. 7 shows a device for testing transmission of pulsation waves.

As explained above, it is a recent tendency that the intake negative pressure is becoming lower and that a flow capacity of the purge valve 8 is becoming large. As the flow capacity of the purge valve 8 becomes larger, a larger amount of pulsating waves is generated in the purge valve 8. An amount of pulsating waves generated in the purge valve and transmitted to the canister 2 is measured in a constant temperature vessel T1 shown in FIG. 7. A canister CN and a prototype purge valve 8 to be tested are disposed in the constant temperature vessel T1, and they are connected through a purging passage 4. Evaporated fuel stored in the canister CN is purged by supplying negative pressure of 60 kPa. The temperature in the constant temperature vessel T1 is maintained at 60° C. during the test. As the purging passage 4, a pipe having a diameter of 11.5 mm and a length of 1500 mm is used. The amount of pulsating waves generated in the purge valve and transmitted to the canister CN is measured by a G-sensor connected to the canister CN.

Figure 8:
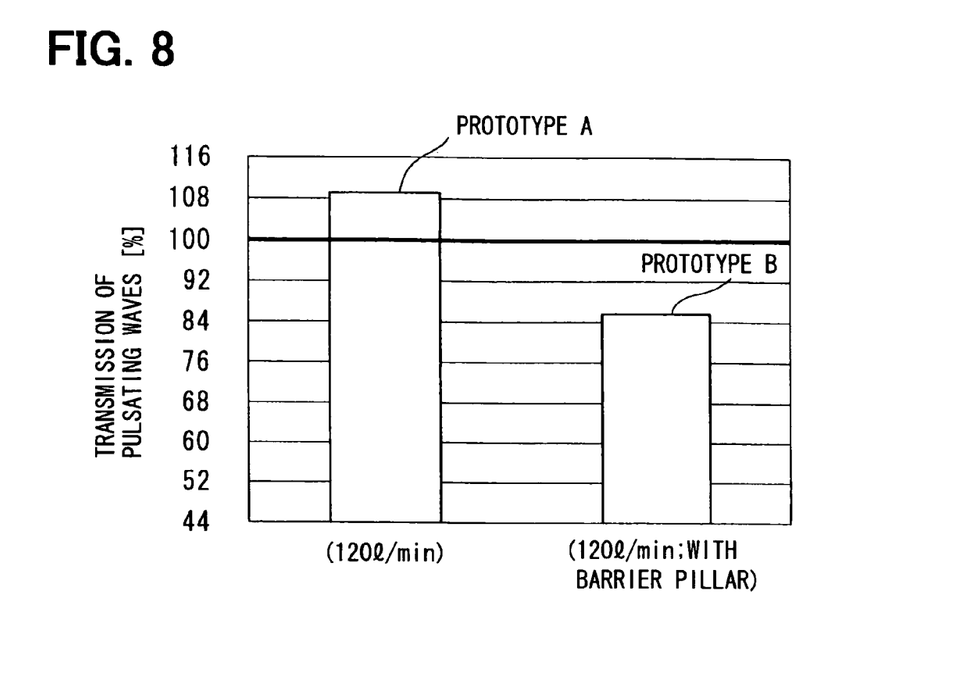
FIG. 8 is a graph showing an amount of transmitted pulsation waves in a prototype A and a prototype B.

Test results showing an amount of pulsating waves generated in the purge valve and transmitted to the canister are shown in FIG. 8. A flow capacity of a conventional purge valve is 60 litter/min. The flow capacity of prototype "A" is increased to 120 litter/min without changing structures of the purge valve. Prototype "B" has the same flow capacity as the prototype "A" (120 litter/min), but its structure is changed according to the present invention. That is, a barrier pillar 31 (that will be explained later in detail) shown in FIG. 1 is added. The amount of pulsating waves generated in the prototype samples "A" and "B" and transmitted to the canister CN are compared with those of the conventional purge valve having a flow capacity of 60 litter/min.

In the graph shown in FIG. 8, the amount of pulsating waves generated in the conventional purge valve and transmitted to the canister is 100% as a reference level, and those of the prototype samples "A" and "B" are shown in comparison with the reference level 100%. As seen in the graph shown in FIG. 8, the higher amount of pulsating waves than those of the conventional purge valve is transmitted to the canister when prototype "A" is tested. On the other hand, in case of prototype "B", a lower amount of the pulsating waves is transmitted to the canister. To lower the amount of the pulsating waves in prototype "A", it is required to enlarge a space of the chamber 18, resulting in increase in a size of the purge valve.

In order to realize a purge valve in which transmission of the pulsating waves is suppressed without increasing its size, a barrier pillar 31 (FIG. 1) is formed in the purge valve 8 according to the present invention. The barrier pillar 31 has to have the following characteristics: (a) A flow resistance of the barrier pillar 31 is small in a normal flow direction (from the inlet port 15 toward the valve port 13), and its flow resistance in a reverse flow direction (from the valve port 13 toward the inlet port 15) is large. The flow resistance is also referred to as a CD value.

To realize the above characteristics (a), the barrier pillar 31 may be formed to satisfy one or more of the following conditions: (b) a cross-section of the barrier pillar increases along the normal flow direction (decreases along the reverse flow direction); (b') an outer width of the cross-section increases along the normal flow direction; (c) the barrier pillar includes a depression 32 facing the reverse flow direction; (d) the barrier pillar is formed in the enlarged chamber 18; (e) the barrier pillar stands up in the enlarged chamber 18; (f) the barrier pillar may include a hole or slit (33); and (g) the barrier pillar is positioned to face the entrance hole (34), and a distance L3 is smaller than a diameter W5 of the entrance hole 34 (refer to FIG. 6B).

Figure 3:
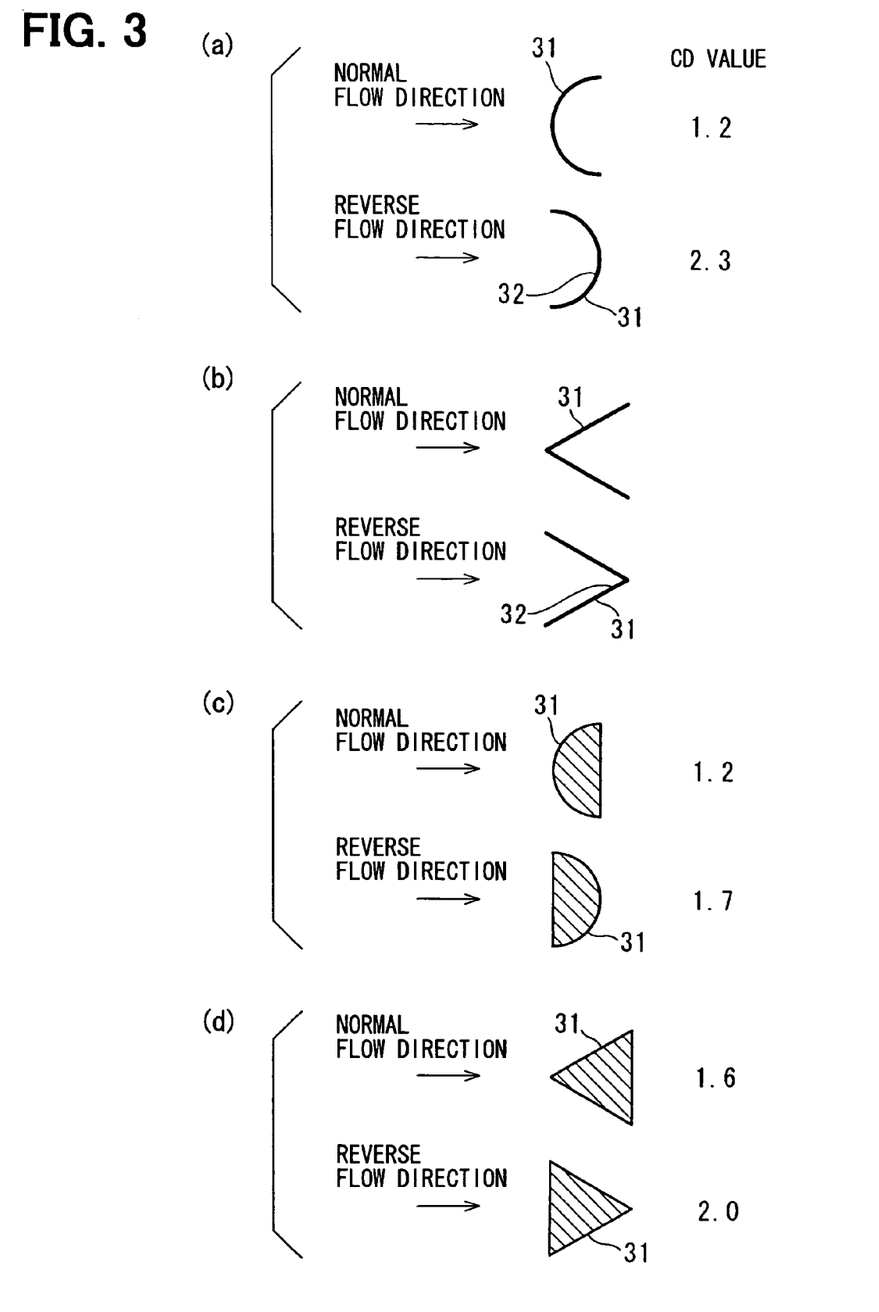
FIGS. 3(a)-(d) are schematic views showing various shape of a barrier pillar used in the purge valve, also showing flow resistance values.
Figure 6A:
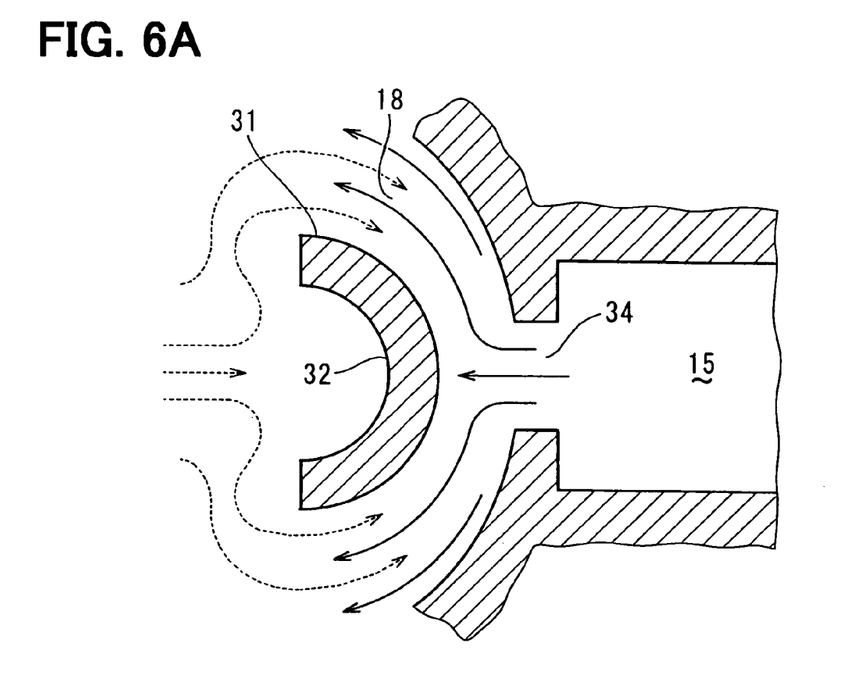
FIGS. 6A and 6B are cross-sectional views showing details of a position of the barrier pillar relative to a valve port.
Figure 6B:
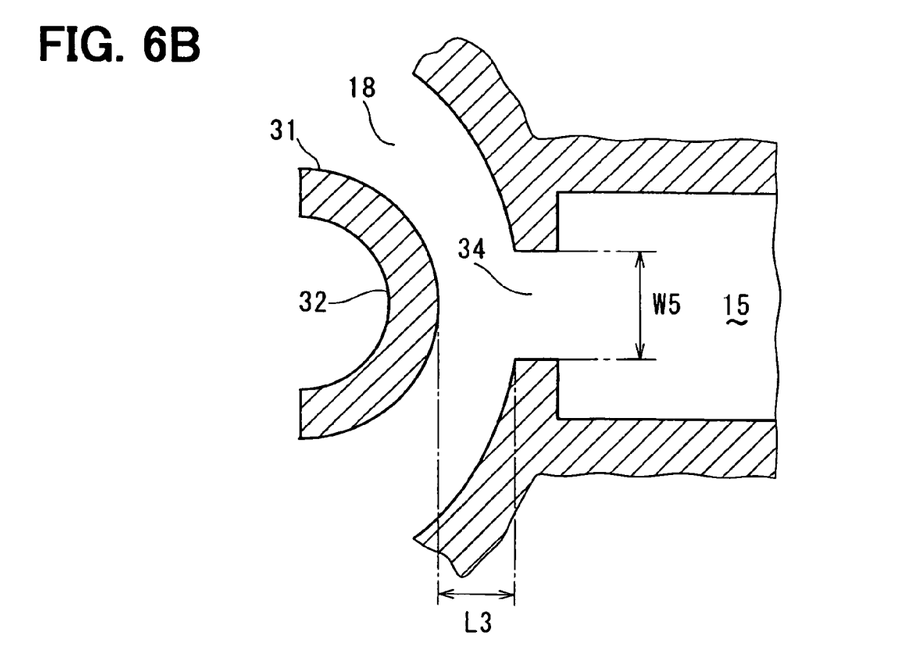

The characteristics (a) mentioned above are realized by any one of the barrier pillar shapes shown in FIGS. 3(a)-(d). In FIG. 3(a), a cross-section of the barrier pillar 31 is half circular and its arc faces the normal flow direction. It is, of course, possible that the arc has a certain thickness (refer to FIGS. 6A and 6B). The CD value in the normal flow direction is 1.2 and 2.3 in the reverse flow direction. The shape shown in FIG. 3(b) also realizes the characteristics (a). In FIG. 3(c), the cross-section of the barrier pillar is a solid half circle. In this case, the CD value in the normal flow direction is 1.2 and 1.7 in the reverse flow direction. In FIG. 3(d), the cross-section of the barrier pillar is a triangle. The CD value in the normal flow direction is 1.6 and 2.0 in the reverse flow direction. In the particular embodiment described above, the barrier pillar 31 is formed to have the shape shown in FIG. 3(a), and its cross-section has a certain thickness as shown in FIGS. 6A and 6B.

Figure 4:
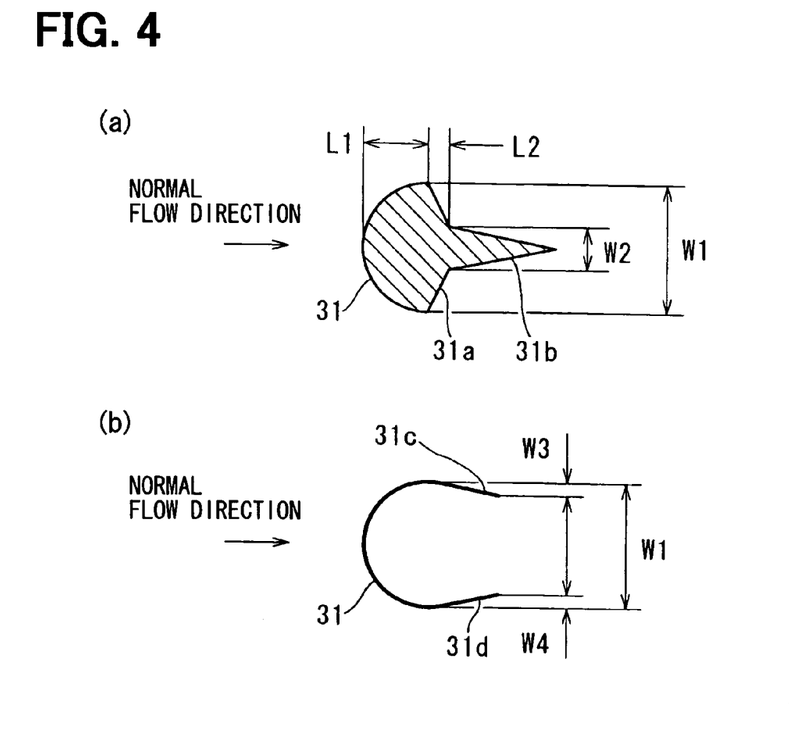
Figure 5:
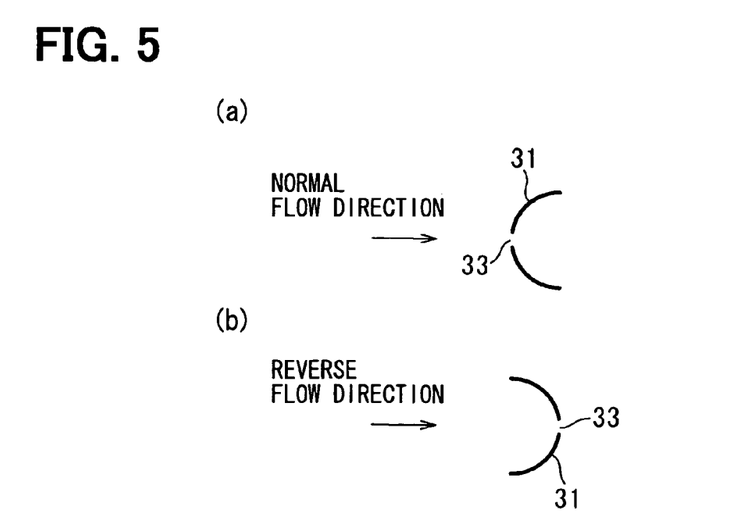

The condition (b) may be realized by the shapes shown in FIGS. 3(c) and (d). These shapes may be modified to the shape shown in FIG. 4(a). In the shape shown in FIG. 4(a), a rear portion 31a, a cross sectional area of which decreases along the normal flow direction, and a projected portion 31b projected in the normal flow direction are included. If L1 is sufficiently larger than L2 (L1>>2·L2), and W1 is sufficiently larger than W2 (W1>>2·W2), i.e., if the CD value is not much affected by those additional portions, the rear portion 31a and the projection 31b may be included.

The condition (b') may be realized by the shapes shown in FIGS. 3(a) and (b). These shapes may be modified to the shape shown in FIG. 4(b) that includes rear portions 31c, 31d having a width decreasing along the normal flow direction. If W1 is sufficiently larger than W3+W4, i.e., if the CD value is not much affected by the rear portions 31c, 31d, the rear portions 31c, 31d may be included.

The condition (c) mentioned above may be realized by the shapes shown in FIGS. 3(a) and (b). The depression 32 is formed facing the reverse flow direction. Because of the depression 32, the flow resistance (CD value) in the reverse flow direction can be made sufficiently high. The condition (d) mentioned above is satisfied in the embodiment shown in FIG. 1, in which the barrier pillar 31 is disposed in the enlarged chamber 18. Since the barrier pillar 31 is disposed in the enlarged chamber 18, no additional space for the barrier pillar is required. The condition (e) mentioned above is also satisfied in the embodiment shown in FIG. 1, in which the barrier pillar 31 stands up from a bottom portion of the housing 16. Since the barrier pillar 31 is formed with the same resin forming the housing 16, the number of components forming the purge valve 8 does not increase. The condition (f) mentioned above may be realized in the shape shown in FIGS. 5(a) and (b), in which a hole or slit 33 is formed through the barrier pillar 31.

The condition (g) mentioned above will be explained with reference to FIGS. 6A and 6B. As shown in FIG. 6A, the barrier pillar 31 is positioned facing the entrance hole 34, so that the airflow including evaporated fuel from the canister 2 (the normal flow direction shown with a solid arrow) passes along the arc portion of the barrier pillar 31, while the pulsating waves generated in the purge valve 8 are hindered by the depressed portion 32 (the reverse flow direction shown with a dotted arrow). In this manner, the transmission of the pulsating waves is suppressed by the barrier pillar 31 while the flow of the evaporated fuel is not disturbed by the barrier pillar 31. As shown in FIG. 6B, a distance L3 between the barrier pillar 31 and the entrance hole 34 is made smaller than a diameter W5 of the entrance hole 34 (L3<W5). Thus, the transmission of the pulsating waves to the canister 2 is effectively suppressed.

Advantages of the present invention will be summarized below. Since the barrier pillar 31 having a low flow resistance in the normal flow direction and a high flow resistance in the reverse flow direction is formed in the enlarged chamber 18, the transmission of the pulsating waves generated in the purge valve due to opening and closing of the valve port 13 are suppressed. It is clear from the test results of prototype B shown in FIG. 8 that the transmission of the pulsating waves are well suppressed without increasing the size of the purge valve, compared with that of the conventional purge valve. Thus, the noises caused by the pulsating waves are well suppressed.

Figure 9:
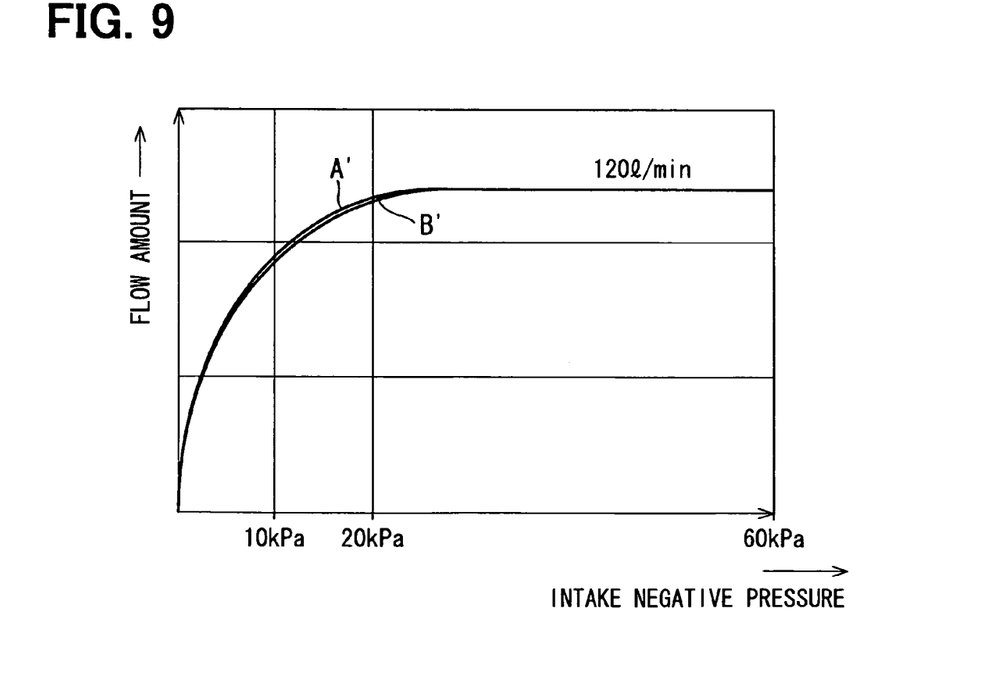
FIG. 9 is a graph showing an amount of gas flow entering into the purge valve under various intake negative pressures.

Since the flow resistance of the barrier pillar 31 in the normal direction is made low, the flow of the evaporated fuel from the canister 2 to the purge valve 8 is not hindered by the barrier pillar 31. FIG. 9 shows test results of prototype A and prototype B with respect to an amount of flow entering into the purge valve 8. In the test, the flow amount is measured under the intake negative pressures, 10 kPa, 20 kPa and 60 kPa. It is seen in the graph that there is almost no difference between the prototypes A and B. This means that the flow amount entering into the purge valve 8 is not much affected by the barrier pillar 31.

The present invention is not limited to the embodiment described above, but it may be variously modified. For example, the number of the barrier pillars 31 is not limited to one. Plural barrier pillars may be formed. The barrier pillars may be disposed in both the inlet port 15 and the enlarged chamber 18. Though the present invention is applied to the purge valve 8 in the foregoing embodiment, it is possible to apply the present invention to other valves. The present invention may be also applied to valves other than the two-way valve, such as a three-way valves or a four-way valves. Though the valve body 14 is driven by the electromagnetic actuator 17 in the foregoing embodiment, it is also possible to drive the valve body with other actuators such as piezoelectric actuators or hydraulic actuators.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A valve device comprising:
   a fluid passage;
   an inlet port for introducing fluid into the fluid passage;
   an output port for discharging fluid from the fluid passage;

a valve body disposed in the fluid passage for opening or closing a valve port disposed in the fluid passage between the inlet port and the outlet port;

an enlarged chamber formed in the fluid passage between the inlet port and the outlet port, the enlarged chamber having a cross-section larger than that of the inlet port and the valve port; and a barrier pillar, disposed in the enlarged chamber, for suppressing transmission of pulsating waves generated in the valve device to the inlet port, the barrier pillar having a flow resistance that is lower in a normal flow direction of the fluid from the inlet port to the valve port than in a reverse flow direction from the valve port to the inlet port, wherein the barrier pillar includes a hole or a slit through which the fluid is able to flow.

2. The valve device as in claim 1, wherein the barrier pillar has a cross-section increasing along the normal flow direction.

3. The valve device as in claim 1, wherein the barrier pillar has a width, measured in a direction perpendicular to the normal flow direction, that increases along the normal flow direction.

4. The valve device as in claim 1, wherein the barrier pillar has a depression facing the reverse flow direction of the fluid flow.

5. The valve device as in claim 1, wherein: the enlarged chamber includes an entrance hole through which the fluid enters into the enlarged chamber from the inlet port; the barrier pillar stands facing the entrance hole; and a distance between the barrier pillar and the entrance hole is smaller than a diameter of the entrance hole.

6. The valve device as in claim 1, wherein the valve device further includes an electromagnetic actuator for driving the valve body.

7. The valve device as in claim 1, wherein the valve body is biased in a direction to close the valve port by a biasing spring.

8. A valve device comprising:

a fluid passage;

an inlet port for introducing fluid into the fluid passage;

an output port for discharging fluid from the fluid passage;

a valve body disposed in the fluid passage for opening or closing a valve port disposed in the fluid passage between the inlet port and the outlet port;

an enlarged chamber formed in the fluid passage between the inlet port and the outlet port, the enlarged chamber having a cross-section larger than that of the inlet port and the valve port; and a barrier pillar, disposed in the enlarged chamber, for suppressing transmission of pulsating waves generated in the valve device to the inlet port, the barrier pillar having a flow resistance that is lower in a normal flow direction of the fluid from the inlet port to the valve port than in a reverse flow direction from the valve port to the inlet port, wherein: the enlarged chamber includes an entrance hole through which the fluid enters into the enlarged chamber from the inlet port; the barrier pillar stands facing the entrance hole; and a distance between the barrier pillar and the entrance hole is smaller than a diameter of the entrance hole.

9. The valve device as in claim 8, wherein the barrier pillar has a cross-section increasing along the normal flow direction.

10. The valve device as in claim 8, wherein the barrier pillar has a width, measured in a direction perpendicular to the normal flow direction, that increases along the normal flow direction.

11. The valve device as in claim 8, wherein the barrier pillar has a depression facing the reverse flow direction of the fluid flow.

12. The valve device as in claim 8, wherein the valve device further includes an electromagnetic actuator for driving the valve body.

13. The valve device as in claim 8, wherein the valve body is biased in a direction to close the valve port by a biasing spring.

* * * * *